(12) United States Patent
Chundi et al.

(10) Patent No.: US 11,375,285 B2
(45) Date of Patent: Jun. 28, 2022

(54) CUSTOMIZED CONTENT SKIP FOR MEDIA PLAYERS

(71) Applicant: Rovi Guides, Inc., San Jose, CA (US)

(72) Inventors: Charishma Chundi, Andhra Pradesh (IN); Susanto Sen, Karnataka (IN)

(73) Assignee: ROVI GUIDES, INC., San Jose, CA (US)

(*) Notice: Subject to any disclaimer, the term of this patent is extended or adjusted under 35 U.S.C. 154(b) by 0 days.

(21) Appl. No.: 16/804,495

(22) Filed: Feb. 28, 2020

(65) Prior Publication Data

US 2021/0274264 A1    Sep. 2, 2021

(51) Int. Cl.
| | |
|---|---|
| *H04N 21/472* | (2011.01) |
| *H04N 21/6587* | (2011.01) |
| *H04N 21/845* | (2011.01) |
| *G06F 3/01* | (2006.01) |
| *G11B 27/10* | (2006.01) |

(52) U.S. Cl.
CPC ......... *H04N 21/6587* (2013.01); *G06F 3/017* (2013.01); *H04N 21/47217* (2013.01); *H04N 21/8456* (2013.01)

(58) Field of Classification Search
CPC ......... H04N 21/6587; H04N 21/47217; H04N 21/8456
See application file for complete search history.

(56) References Cited

U.S. PATENT DOCUMENTS

| | | | |
|---|---|---|---|
| 2012/0134646 A1* | 5/2012 | Alexander | G11B 27/322 386/241 |
| 2014/0258854 A1 | 9/2014 | Li | |
| 2015/0037000 A1* | 2/2015 | Brinkley | G11B 27/005 386/240 |
| 2015/0293676 A1 | 10/2015 | Avrahami | |
| 2015/0370402 A1* | 12/2015 | Checkley | G06F 3/0487 345/173 |
| 2016/0299648 A1 | 10/2016 | Migos et al. | |
| 2017/0006252 A1 | 1/2017 | Patel et al. | |
| 2017/0285861 A1 | 10/2017 | Siddiq et al. | |
| 2018/0293244 A1* | 10/2018 | Lin | G06F 3/0488 |
| 2020/0077135 A1* | 3/2020 | Niland | H04N 21/4312 |

OTHER PUBLICATIONS

PCT International Search Report for International Application No. PCT/US2020/066375, dated Apr. 12, 2021 (13 pages).

* cited by examiner

*Primary Examiner* — Hsiungfei Peng
*Assistant Examiner* — Fred Peng
(74) *Attorney, Agent, or Firm* — Haley Guiliano LLP

(57) ABSTRACT

Systems and methods for determining a skip time for navigating a media content in a media content system are disclosed herein. An input to perform a media content skip operation on the media content is detected. A current play position time in the media content is further detected, and a skip time amount based on the current play position time and a total media content play time is determined. The media content is skipped to a new play position time based on the skip time amount in response to the detected input.

20 Claims, 12 Drawing Sheets

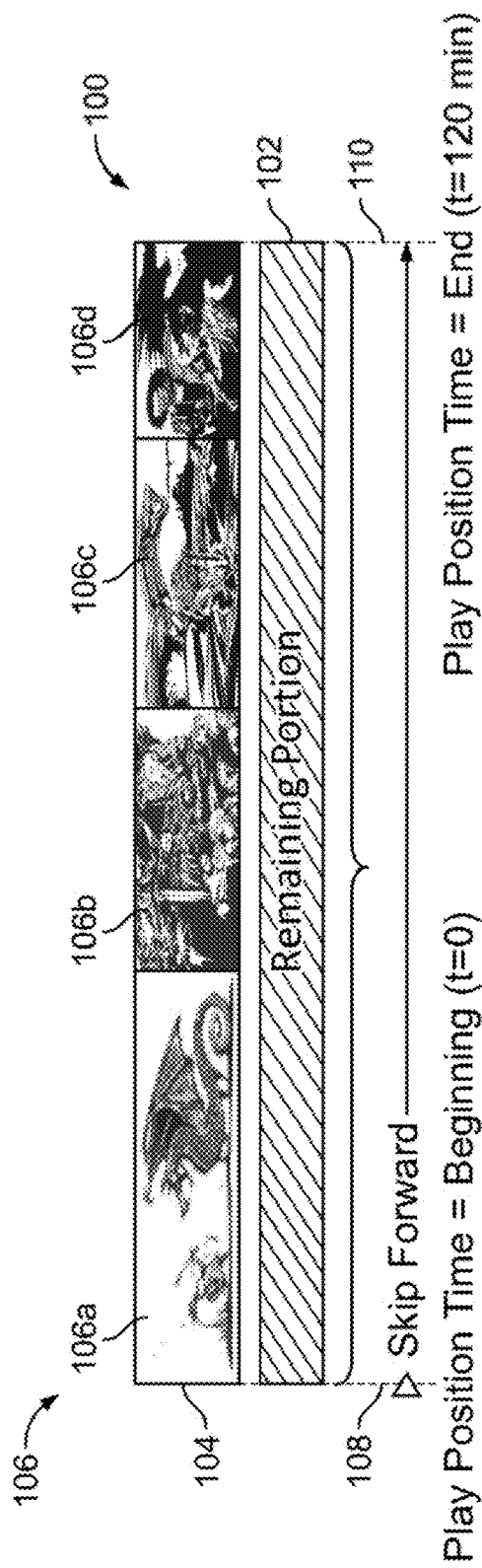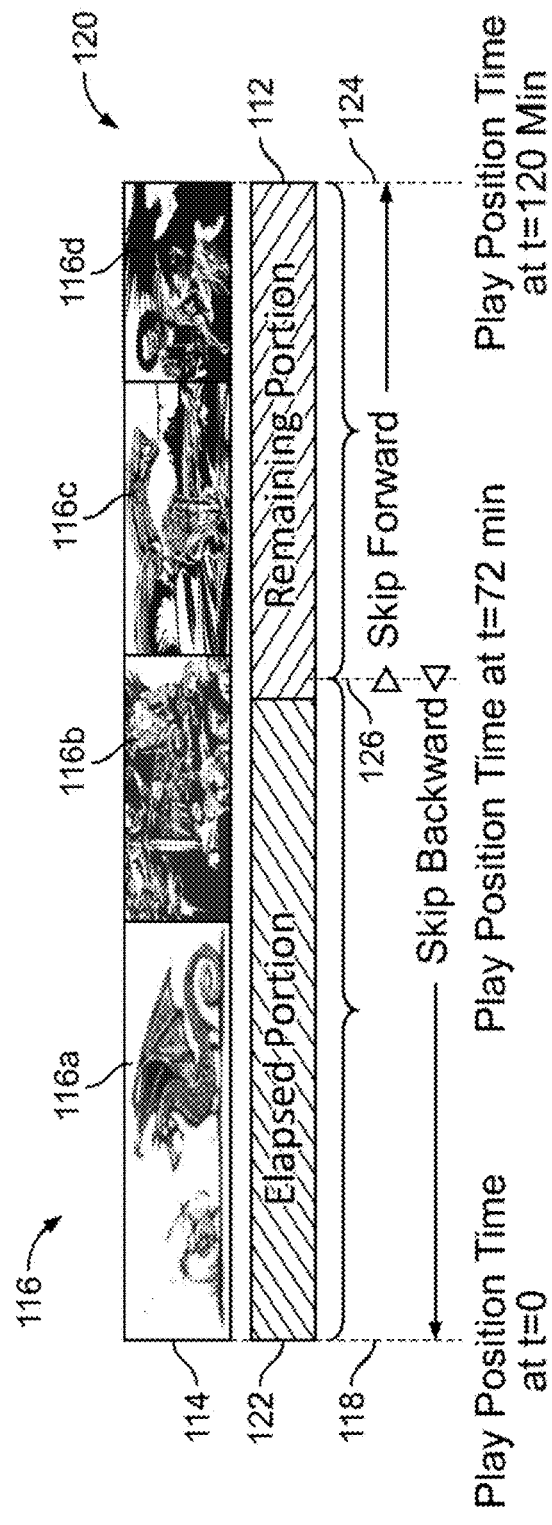

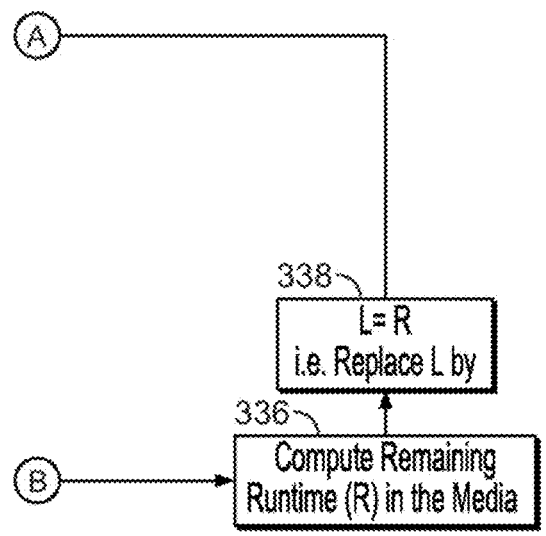
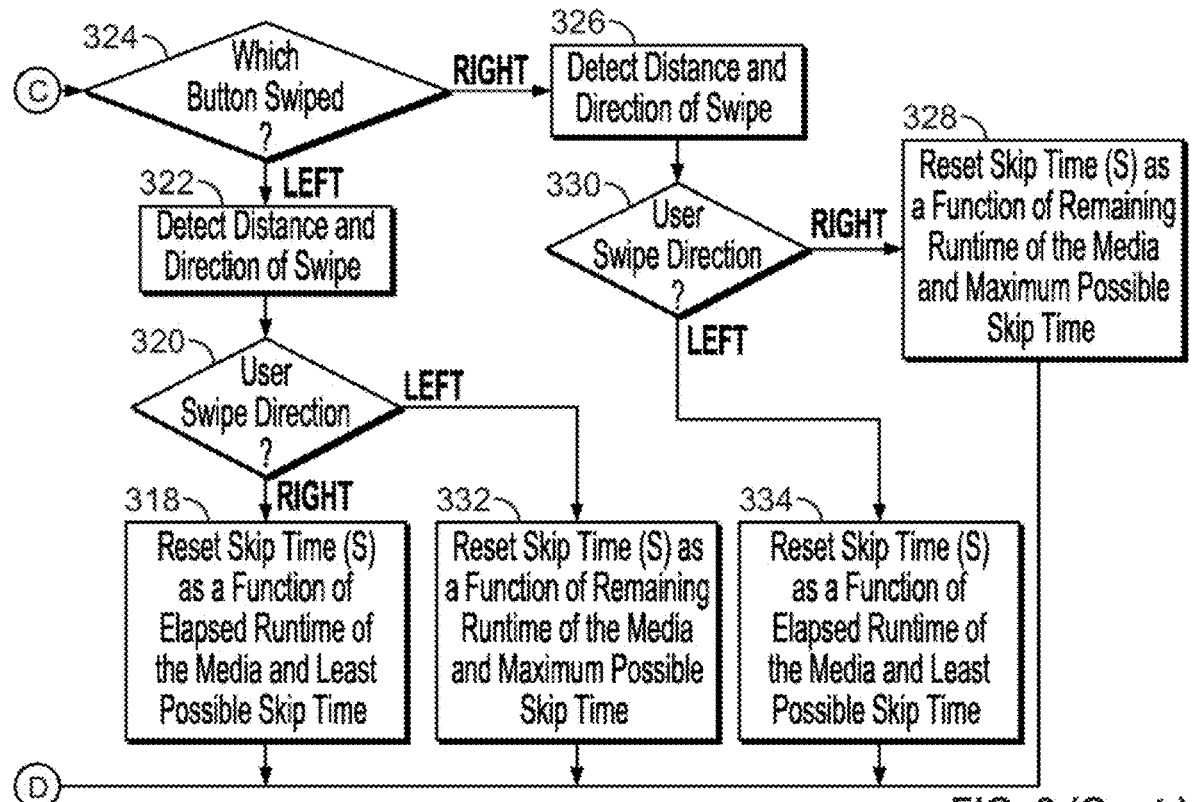
FIG. 3 (Cont.)

CUSTOMIZED CONTENT SKIP FOR MEDIA PLAYERS

BACKGROUND

The present disclosure relates to media play systems and methods and, more particularly, to systems and methods related to media play operations.

SUMMARY

Audio and video media devices, such as dedicated recorders, televisions, and, more recently, handheld devices (e.g., smartphone and tablets) offer their users the flexibility to perform various media content manipulation, offline (disconnected from Internet access) or online (while connected to the Internet wirelessly or with wire). Benefiting from modern-day technology advancements, media device users enjoy flexible media content (e.g., videos and audio books) consumption at and during a time of their choosing, at a location of their choosing, and with a media device of their choosing.

Media devices are ubiquitous, available on a variety of platforms, and implemented on and compatible with a variety of networks and electronic devices. With media device technology continuously growing in application, it is no surprise that each media device type features a unique user experience. For example, a smart television or a digital recorder in combination with a large screen display offers the consumer no less than a theater-like viewing experience, yet a smart handheld device offers the consumer the convenience of mobility. Where an audio player may not have or need graphics features, a video player typically does. Where a large form factor media player, such as a desktop computer, may be void of touchscreen media content functionality, a small form factor media player, such as a smartphone, is nearly always expected to have a touchscreen feature.

Media content functionality, like a touchscreen seekbar for media content skip operations, is among fairly recent electronic entertainment device improvements offering the consumer flexibility and convenience to rapidly navigate media content with a simple touch of the finger. Accordingly, different media device types offer different user experience, flexibility, and convenience. But a seekbar feature in a small form factor media device with a small-size screen display can clearly present an inconvenient experience to a—particularly adult—media content consumer; conversely, an adjustable skip time feature, such as an adjustable skip button, can present a more friendly media interaction experience.

Consumer-driven media content navigation features can help with marketability. Accuracy of content operations and high content operation speeds are among noteworthy media device marketability attributes. Consumer frustration with media content play operations is rather typical in the face of cumbersome seekbar adjustment requirements when reaching as close as visibly possible a desired media content play position with acceptable precision. An adjustable and customized skip time functionality, such as a skip time button, can improve media device user experience considerably by causing skip operation convergence to a precise user-intended media content play position.

Consider a media player with a conventional time lapse or skip button feature(s) that enables a user to skip (forward or backward) through a video or audio recording by seconds and/or minutes. Currently, a source of user frustration is burdensome skip feature activation to navigate a media content forward or backward. In some cases, the user is required to repeatedly depress, tap, or press on a skip button before reaching an intended media content destination (a desired play position)—an interesting portion of the media content, for example, the end of a previously consumed media content episode. User frustration stems, at least in part, from the lack of proportionality between the current play position time (e.g., in a Harry Potter episode) and the total media content play time (e.g., the entire length of a Harry Potter episode). In other words, the skip time amount granularity remains constant without regard to media content duration. A 5-minute skip time feature may not be ideal for a 10-minute (total) video duration, whereas a 2-second skip time feature may be; a 2-second skip time feature may not be ideal for a 1-hour video duration, whereas a 5-minute skip time may be.

In some devices, a skip (time) option is displayed on a screen display of a corresponding media device (e.g., laptop) as an overlay on the media content (e.g., video), iconically appearing with an encircled double arrowhead pointers. Typically, two skip buttons, one on either side of the play button, allow the user to skip a media content forward or backward by a fixed time period. For instance, a one-time skip button touch on the left side of the play button skips the media content backward by a standard 5 seconds or 10 seconds, and a one-time skip button touch on the right side of the play button skips the media content forward by a standard 5 or 10 seconds. If the user desires to skip through a non-standard short media content duration, such as 2 seconds, the skip buttons prove ineffective because they are restrained by a 5- or 10-second fixed granularity.

Lack of adequate skip time granularity can further contribute to adverse user experience when navigating relatively longer media content. For example, if the user wishes to skip ahead by 20 minutes using a 10-second pre-configured skip button, the user must touch the skip button an impractical 120 number of times (120 min=20 min×60 secs/10) before reaching the intended play position, a cumbersome experience indeed.

In summary, whereas media content consumers are sure to enjoy the experience of navigating to a desired media content play destination with speed, accuracy, flexibility and ease, they are instead met with inconvenient media operations features, such as multiple button or tab clicks and seekbar slides with compromised speeds and accuracy.

Media content manipulation mechanisms, techniques and systems are introduced to facilitate convenient, rapid and precise media content skip time outcomes of media device content. As used herein, the term "media device" is synonymous with "media content equipment." Some disclosed embodiments are effective for smaller form factor media devices, such as over-the-top (OTT) platform-based devices. In some embodiments, larger form factor media devices can be effective candidates as well.

In some disclosed systems, two optional modes are available to a media content consumer an automatic mode and a customized mode. In some embodiments, optionally, a skip time is automatically determined for media content consumers based on the media content length. In some disclosed systems, a user may dynamically customize the skip time of or for a media player.

In either mode, a play position (for example, a Harry Potter episode) in the media content (Harry Potter series) is determined. The play position is a place in the media content from which the user desires to start to consume or resume consuming the media content. Continuing with the Harry Potter example, a user may wish to start watching a particular episode starting from the middle of the episode, an episode portion starting from the beginning (play position) to the middle (play position) of the episode. The user may wish to consume the remaining second Harry Potter episode half, an episode portion starting from a play position marked by a remaining episode portion to the end of the episode or somewhere in between.

In both the automatic and customized modes, a media content skip operation (e.g., skip forward or skip backward) performed on a media content on a media content equipment (or "media device") is determined. The desired media content skip operation is performed by determining a media content skip time amount. In the automatic mode, the media content skip play operation may be media content duration sensitive. In an example application, a Harry Potter episode may be skipped forward or skipped backward to a desired play position time in the episode at an adjustable and determined, rather than a fixed or pre-configured, skip time.

In some embodiments, the skip time is in units of time (e.g., a number of seconds skipped) or units of the media content (e.g., a number of video frames skipped). Where relevant herein, references to "time" apply equally to "frames." For example, a reference to "play position time" applies equally to "play position frame."

In accordance with some disclosed systems and methods, the media skip time is determined based on the current play position and the total media content play time. For example, the skip time amount may be determined based on how much time remains in the media content from the current play position. In some embodiments, as the remaining amount of time decreases, the skip time amount also decreases.

In some embodiments, the media skip time is determined based on the total media content play time (total runtime) and a media content play position time. Suppose a 100-minute Harry Potter episode is to be viewed by a consumer from the beginning of the episode to the 20-minute play position. At the beginning of the episode, the system skips an amount based on the 100 minutes, for example, 5% of 100 minutes. Then, from the 5-minute mark (5% of 100 minutes), the system may reduce the skip time based on a 5/100 ratio and so forth until the user reaches the desired 20-minute play position.

In some embodiments, the skip amount granularity is user configurable to facilitate rapid and convenient user navigation capability by ease of user identification of the desired media content play position. Simply stated, the skip time amount keeps up with the media content duration. The ease and precision with which skip operations reach the consumer desired media content play position are realized by a customized skip rate granularity adjustment. In the customized mode, skip features facilitate flexible, fast, and accurate user navigation to reach a desired play position. Conveniently, an inflexible consumer navigation experience using preset skip buttons is replaced with a consumer-controlled and adjustable navigation experience.

In disclosed customized modes, one or more user input may adjust the skip time amount. For example, a user action—e.g., a skip button, tab, or bar press or touch-in each user swipe direction may cause the skip time amount to increase proportionately to the swipe length, a distance defined by a user swipe path along a screen display or monitor. In some embodiments, the distance is measured by an overlaid grid on the screen display, from the start of the user skip swipe to the end of the user skip swipe.

In some embodiments, the skip time is displayed on a screen display with an onscreen or off-screen skip button, skip tab, skip touchpad, or any other suitable mechanism that may be implemented in or for a media player for receiving user action as input.

In some embodiments, the user is privy to the skip time through a display during a corresponding skip time operation. Continuing with the Harry Potter episode example, the user may watch the Harry Potter episode on a media device screen display while navigating the Harry Potter episode using a skip button feature.

In accordance with disclosed methods and embodiments, a media content skip time amount granularity changes based on the remaining amount of media content play time to promote fast, precise and convenient media content navigation.

BRIEF DESCRIPTION OF THE DRAWINGS

The above and other objects and advantages of the disclosure will be apparent upon consideration of the following detailed description, taken in conjunction with the accompanying drawings, in which:

FIGS. 1A and 1B illustrate example media content skip operation screen displays, in accordance with disclosed methods and systems;

DETAILED DESCRIPTION

Figure 2:
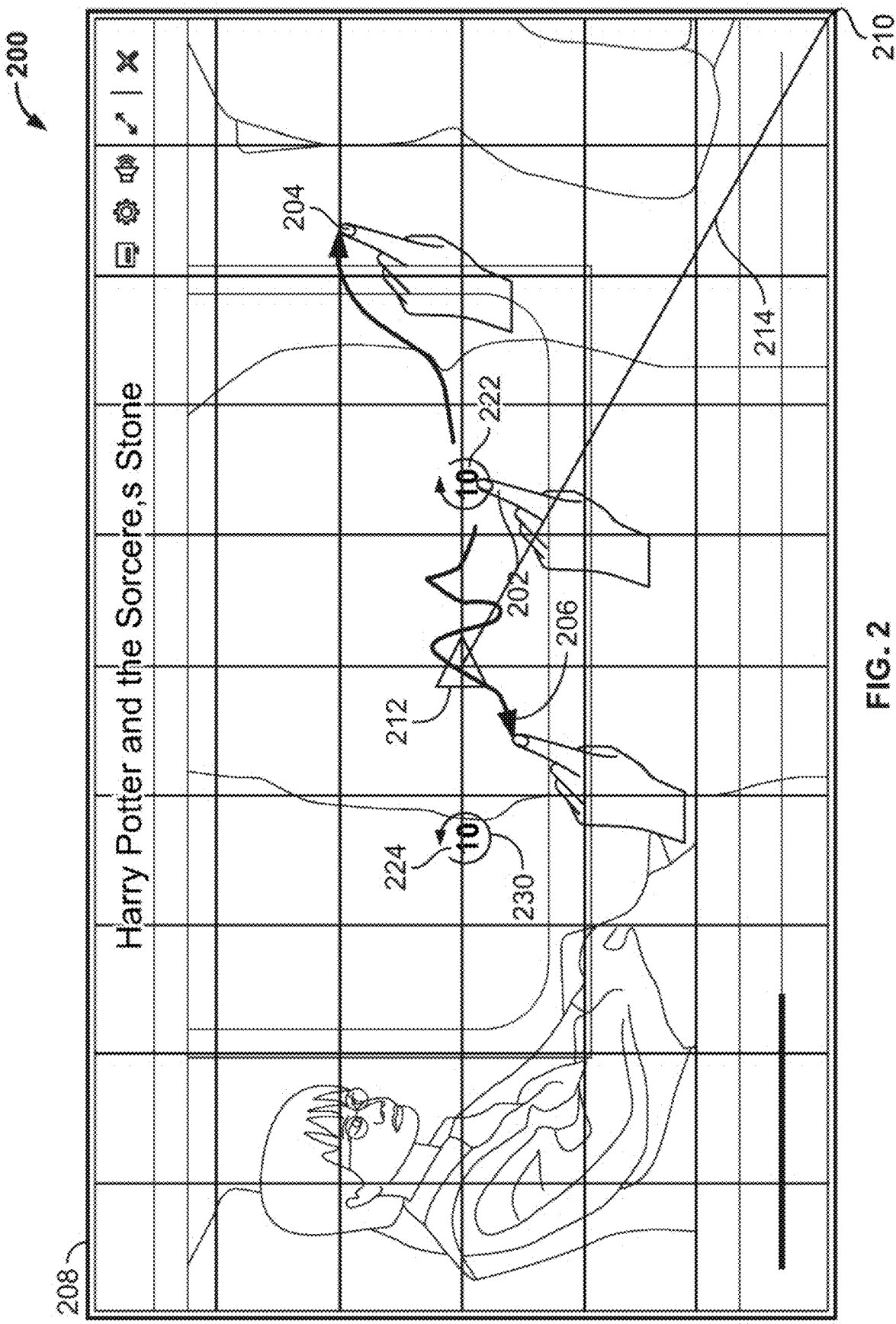
FIG. 2 shows a media content operation skip screen display example, in accordance with disclosed methods and systems.

FIG. 1A illustrates an example media content skip operation screen display, in accordance with disclosed methods and systems. In FIG. 1A, a media content skip operation screen display is configured as a media content skip operation screen display 100. FIG. 1A and the following discussion thereof is an illustrative example of a media content skip operation performed in an automatic mode. For the purpose of illustration, media content skip operation screen display 110 is shown to include a remaining portion 102-a media content length between a current media content play position time to a desired media content play position time-of a media content 104. In the example of FIG. 1A, media content 104 includes episodes 106 of the 2019 television series "Game of Thrones". Episodes 106 includes four episodes 106a, 106b, 106c, and 106d. Each of the four episodes, 106a-106d, may have a distinct total episode length (time or duration). For example, assuming media content 104 is shown to scale for the sole purpose of this illustrative discussion, at screen display 100, episode 106a is shown to have a longer episode duration than each of the remaining three episodes 106b-106d. For the purpose of simplicity, FIGS. 1A and 1B show the same "Game of Thrones" episodes and the total duration of all four "Game of Thrones" episodes are presumed 120 minutes.

In FIG. 1A, a play position time 108 is shown at the beginning of episodes 106, or t=0, "t" representing time. A play position time 110 is shown at the end of episodes 106, or t=120 minutes, the total runtime. In the example of FIG. 1A, the user/consumer has yet to consume any of the episodes 106 and may wish to navigate the episodes 106 by performing a skip operation, for example, to skip to a play position time marked by an end of episode 106a, a play position time marked by an end of two episodes 106a, 106b, a play position time marked by an end of three episodes 106a, 106b and 106c, or a play position time marked by the end of all four episodes 106-play position time 110. In conventional techniques, a skip forward operation of the "Game of Thrones" episodes 106 or any combination of episodes 106a, 106b, 106c, and 106d is performed by the same skip time amount despite the total episode duration. That is, the media content skip time operation granularity is constant despite varying episode durations. A consumer desirous to skip forward to play position time 110 versus a play position closer to play position time 108 is forced to perform the operation at a fixed skip time amount, for example, by clicking a 10-second skip button, and even then, with comprised accuracy. In contrast, disclosed methods and systems facilitate navigating episodes 106 by determining a skip time amount in an automatic mode based on the current play position time (t=0) and a total media content play time (t=120 minutes). The consumer can navigate the episodes by skipping forward or backward to reach a desired play position within episode 106 more quickly than with traditional techniques. In some embodiments, the determined skip time amount decreases as the remaining media content play time decreases. In the example of FIG. 1A, as the current play position nears the end of the episodes 106, t=120 minutes (from t=0), the skip time amount decreases.

FIG. 1B illustrates an example media content skip operation screen display, in accordance with disclosed methods and systems. In FIG. 1B, a media content skip operation screen display is configured as media content skip operation screen display 120. Like FIG. 1A, FIG. 1B and the following discussion thereof is an illustrative example of a media content skip operation performed in an automatic mode. Media content skip operation screen display 120 includes a remaining portion 112 and an elapsed portion 122 of a media content 114. In the example of FIG. 1B, media content 114 includes four episodes 116 of the 2019 television series "Game of Thrones". Like the example of FIG. 1A, each of the four episodes, 116a-116d, may have a distinct total episode play length or total episode play time. For example, episode 116a is shown to have a longer episode duration than each of the remaining three episodes 116b-116d. In FIG. 1B, a play position time 118 is shown at the beginning of episodes 116, or t=0, and a play position time 124 is shown at the end of episodes 116, or t=120 minutes, the total runtime. Additionally, a play position time 126 is shown at the middle of episodes 116, or t=72 minutes.

FIGS. 1A and 1B present two of numerous other examples of skip time features for automatically determining a skip time amount based on the total length of the media content. In some disclosed systems, as will be further described with reference to subsequent figures, such as FIG. 2, the consumer may dynamically customize the skip time amount of or for a media device.

Each of the screen displays 100 and 120 may be implemented in a media device. Non-limiting examples of a media device are smart televisions, smartphones, tablets, desktop computers, servers, and laptop computers, further detailed in reference to FIG. 11.

Disclosed methods include determining a media content skip time amount for navigating the media content (e.g., a Harry Potter episode) by detecting an input to perform a media content skip operation (e.g., skip forward or skip backward) on the media content. A current play position time in the media content is detected, and a skip time amount is determined based on the current play position and the total media content play time (e.g., 120 minutes in the example of FIGS. 1A and 1B). In response to the user input, the system then skips to a new play position time in the media content based on the skip time amount.

In some embodiments, the skip time amount is determined by calculating the ratio between the play position time and the total media content play time. Alternatively, the skip time amount may be determined by detecting a remaining media content play time (e.g., of a remaining portion 112, in FIG. 1B) based on the play position time and the total media content play time and determining the skip time amount based on the remaining media content play time.

FIG. 2 shows a media content operation skip screen display example, in accordance with disclosed methods and systems. In FIG. 2, a media content skip operation screen display is configured as a media content skip operation screen display 200 of a media device. FIG. 2 is an example of a media content skip operation performed in a customized mode. In accordance with some disclosed features and methods of the customized mode, a consumer may dynamically customize a skip time of or for a media device. Screen display 200 may be a part of the media device or it may be externally and communicatively located relative to a media device. For the purpose of discussion and illustration, the media content example of screen display 200 is a Harry Potter episode. Screen display 200 is presumed a touchscreen in the example of FIG. 2, sensitive and reactive to user input. For example, some touchscreens are sensitive and reactive to human skin heat. A user touch activates responsiveness to further user input, such as a user swipe or user button depression. In some embodiments, suitable user input-receiving components other than a touchscreen may be utilized. For example, a user input-capable remote control, a touchpad, a joystick, and a mouse, are among the host of suitable mechanisms for receiving a user input.

Screen display 200 is equipped with media content skip functionality. In an embodiment, the skip functionality of screen display 200 comprises one or more skip buttons. In the example of FIG. 2, screen display 200 includes at least two skip buttons, a skip button 222, positioned at 202 of screen display 200, and a skip button 224, positioned at 230 of screen display 200. Each of skip buttons 222 and 224 offers a skip time feature functionality, initially set at a default time prior to the start of a recognized user input such as a user touch, push, or click. In the customized mode, skip time amount is adjustable. For example, initially, a recognized skip button 222 touch may set the default time. In the example of FIG. 2, the default time is set at 10 seconds. In some embodiments, the default time may be set with reference to a media content runtime. It is understood that the default time may be set at any suitable time, 10 seconds being merely one example of many others.

In contrast to existing preconfigured media content skip features, in FIG. 2, the skip operation (to skip forward or to skip backward) is flexibly and conveniently customized by media content consumer screen touch, enabling the user with dynamic skip operation customization. In some embodiments, the skip time amount can be determined by overlaying a two-dimensional (2-D) grid, such as grid 208, on screen display 200 to obtain a user swipe length measurement in response to a user swipe action, such as a user finger swipe along screen display 200. In an embodiment, grid count may facilitate swipe length measurement in response to a screen display user swipe action. An example user swipe action may be a user index finger swipe along the 2-dimensional grid 208 overlay on screen display 200, as shown in FIG. 2.

In some embodiments, detection of a user input causes skip time amount adjustment. The skip time amount may be adjusted by a user swipe action in a skip direction based on the user swipe direction. The skip time amount may be adjusted based on a length of the swipe action.

In some embodiments, swipe action length may be determined by measuring the distance determined by a swipe action path. The swipe action length may be defined by a distance covered by a user swipe path, where the swipe distance may determine the skip time amount and the swipe direction may determine whether skip time should be increased or decreased. In FIG. 2, grid 208 measurements may determine the swipe length and swipe direction and therefore the skip time amount and skip direction, respectively. For example, a user swipe to the right may increase the skip time amount and a user swipe to the left may decrease the skip time amount, or vice versa. In some embodiments, skip time is increased or decreased proportionately to the remaining media content runtime and the swipe length. In FIG. 2, as the remaining media content runtime (of the remaining portion) decreases, the skip time amount may be automatically decreased, or the user swipe direction may determine whether the skip time increases or decreases. For example, in response to a user swipe to the left (relative to 202), the skip time amount is lessened based on the swipe length (or path coverage), and in response to a user swipe to the right (relative to 202), the skip time is increased based on the swipe length (or path coverage). In the example of FIG. 2, the user swipe action in a left swipe direction (relative to 202) is a zigzag pattern, and the user swipe action in a right swipe direction (relative to 202) is more of a linear (or straight line) pattern. A zigzag pattern can clearly cover a greater swipe length on the screen display than a straight line or linear pattern; the skip time amount is accordingly affected.

In the example of FIG. 2, a user index finger swipe action to a left direction (looking into the figure page) is shown to extend toward 206 in a meandering (or zig-zag) fashion along screen display 200. The pattern starts at 202 extending upwardly to an adjacent left-direction upper grid, then travels downwardly, approximately one-grid distance to the left direction from 202, to a grid situated adjacently below and to the left. The meandering pattern continues upwardly, by a nearly two-grid distance from 202, to a previously traveled grid positioned before extending downwardly (and to the left) to an adjacent grid, a nearly 2.25-grid distance from 202, to arrive at 206. As the user swipe path travels from 202 to 206, the system skips the media content by a smaller skip time amount.

As earlier discussed, in some embodiments, the elapsed media content runtime may be calculated by grid counting, for example using grid 208. In the example of FIG. 2, among other possible positions on screen display 200, the system may automatically reset the default skip time by activating skip button 222 or skip button 224, a (0,0) x-y coordinate at screen display 200. A measured swipe action relative to the foregoing x-y coordinate may determine the swipe length and direction and therefore the skip amount and skip direction, respectively.

As previously explained, in response to a user right swipe direction (from 202 toward 204), the skip time is increased proportionately to the swipe length based on the remaining media content runtime (remaining portion). It is understood that while in the example of FIG. 2, a swipe direction to the left causes the media content skip time amount to decrease and a swipe direction to the right causes the media content skip time amount to increase, a media device may be configured in opposite; a left swipe direction may cause an increase and a right swipe direction may cause a decrease in the media content skip time amount. The proportionality between the swipe length and the skip time amount may be a design feature. In some embodiments, the proportionality is based on the corresponding media device screen display size. For example, a minimum skip action, i.e., skip distance, may translate to be a small unit of time (e.g., several seconds).

In some embodiments, a maximum skip time may be a function of the remaining media content runtime. Assume for example that the maximum distance a user swipe path can cover on the screen display is half of a diagonal dimension of the screen display, i.e., the distance shown at 214 extending from 212 to 210 of screen display 200. A user swipe action along 214 causes the skip time amount to be a function of the maximum skip time amount for the remaining media content runtime, such that a user swipe action to 210 will cause the skip time amount to be the maximum skip time amount.

FIG. 2 presents an example media content skip amount flexibility. The media content skip amount granularity is adjustable to achieve flexible and convenient media content skip operation adjustment. The granularity adjustment may be automatic and user driven, facilitating rapid media content skip operation, for example, media content skip advancement, to a user-desired play position. The skip time keeps up with the media content duration. Precision and flexibility in reaching the desired media content play position are realized, at least in part, by replacement of preset (or pre-configured) functionality features, such as a 5-second or a 10-second skip button, with, for example, an adjustable skip button.

Figure 3:
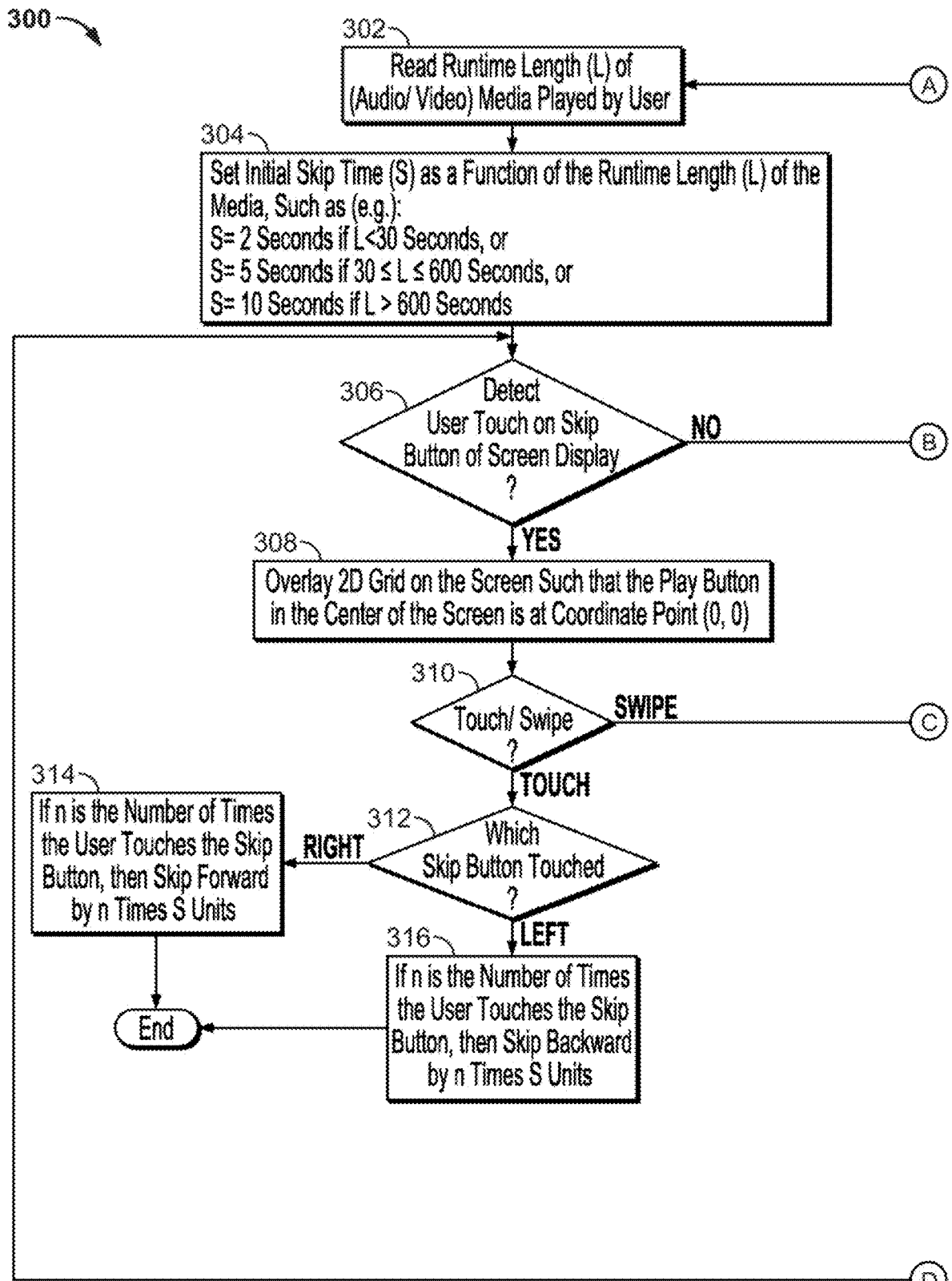
FIG. 3 depicts an illustrative flowchart of a skip time reset process, in accordance with disclosed methods and embodiments.

FIG. 3 depicts an illustrative flowchart of a skip time reset process, in accordance with disclosed methods and embodiments. In FIG. 3, a flowchart of a skip time reset process 300 is shown in accordance with disclosed methods and embodiments. In a nonlimiting example, process 300 comprises relevant steps performed by a system implementing the embodiment of FIG. 2, specifically, a media device with screen display 200. For the purpose of clarity, process 300 is hereinafter described relative to the screen display 200 of FIG. 2. Additionally, a control circuitry, such as control circuitry 1128 or 1120 or computing device 1118 of FIG. 11, may implement the entire or parts of process 300, in accordance with example implementations.

At step 302, a control circuitry, such as control circuitry 1128 or 1120, may detect a media content runtime length, represented by "L," of a user-operated media player. Next, at step 304, an initial skip time amount, represented by "S," is set as a function of the media content runtime length, L. In a nonlimiting example, S may be set equal to 2 seconds if L is less than 30 seconds or S may be set equal to 5 seconds if L is greater than or equal to 30 seconds and less than or equal to 600 seconds, or S may be set equal to 10 seconds if L is greater than 600 seconds.

At step 306, a determination is made of an input in the form of a user action. For example, the system detects an input in the form of a user touch of skip button 222 or skip button 224 in FIG. 2, on media screen display 200. In response to a determination that the user has touched the skip button, process 300 continues to step 308; otherwise, process 300 continues to step 336.

At step 308, a two-dimensional grid, like grid 208 of FIG. 2, is (electronically) overlaid onto the screen display. In some embodiments, the grid may be a self-contained display screen option alleviating the grid overlay display step. For example, displaying grid 208 may be facilitated by a configurable display setting. In some embodiments, electronic placement of the 2-dimensional overlay may position a play button (such as play button 620 in FIG. 6) at an approximately center position of a screen display, such as screen display 200. For example, the play button may be positioned at an x-y axis coordinate (0, 0), to align skip button 222 at the grid (and screen display) center location to allow for maximum user swipe distance in different directions on the screen display. When activated by a user, a play button, such as a play button 620 (FIG. 6), is detected alerting the start of a user interactive action with the screen display. In some embodiments, step 308 is omitted and a grid is not overlaid on the screen.

At step 336, the remaining media content runtime, represented by "R", is determined and step 338 is performed. At step 338, L is set equal to R. That is, the total media content runtime is set equal to the (updated) remaining media content runtime (R), calculated at step 336, and the process repeats from step 302.

Subsequently, at step 310, a determination is made as to whether a user swipe versus a user touch is detected. As previously noted, a user swipe or touch may be detected by techniques employed by current touchscreen display technology. In some embodiments, detection of a user action may be performed in other suitable manners. For example, a user stylus action may be detected on the screen display of a user tablet. Pressing the stylus onto the screen display, touching the screen display with the stylus, or any other type of suitable contact with the screen display may be a detected input.

At step 310, process 300 proceeds to step 324 in response to determining that a user swipe is detected and proceeds to step 312 in response to determining that a user touch is detected. A user touch may be implemented by a nonlimiting functionality example, such as a screen button (as previously noted), whereas a user swipe is a user displacement action on the screen display, such as the act of dragging the user finger or a stylus across the screen display.

At step 312, which skip button (e.g., the right or left button) the user touched is determined. In response to a determination that the user touched the right button (e.g., the skip forward button), process 300 proceeds to step 314. In response to a determination that the user touched the left button (e.g., the skip backward button), process 300 proceeds to step 316. At both steps 314 and 316, the number of detected user touches is determined, and the media content is skipped forward (at step 314) or skipped backward (at step 316) based on the detected number of touches. For example, at step 314, the media content is skipped forward by "N" number of times ("N" being an integer value) based on an "N" number of detected user touches, e.g., N number of detected user touches of the left skip button. In some embodiments, the number of detected user touches (or user swipes) may correspond to the number of skips by which the media content is skipped forward or backward. For example, assuming still that "S" represents the skip time, at step 314, the media content is advanced by S, an N number of times. In a practical application, at step 314, a Harry Potter episode may be advanced five times, in response to five detected user touches (or user swipes), and each of the five times, the episode is advanced by 10 seconds or a total of 50 seconds. The episode may be advanced based on units of time or frames. For example, at each of the five detected user touches (or user swipes), the episode may be advanced by one minute, a total of 5 minutes, or at each of the five detected user touches (or user swipes), the episode may be advanced by 300 frames, for a total of 1,500 frames. Correspondingly, the media content may be skipped backward at step 316, N times, each of the N times by S units. In some embodiments, more than one touch may cause a media content skip operation. For example, the skip operation may be performed every other or every three user touches. It is understood that the steps of process 300 may be implemented in other suitable order with other suitable indications and determinations. For example, an action detection at step 312 may cause the episode to skip backward at step 314 and to skip forward at step 316. It will be understood that step 312 is merely illustrative and, in some embodiments, steps 310 and 312 may be combined.

At step 324, which skip button (e.g., the right or left button) the user swiped is determined. In response to a determination that the user swiped the right button, process 300 proceeds to step 326, and in response to a determination that the user swiped the left button, process 300 proceeds to step 322. At both steps 326 and 322, the user swipe length and swipe direction are determined. In an example of a user swipe length, as earlier discussed, a greater user swipe path on the screen display may be determinative of a skip time amount, for example, causing a slower (or faster) skip time amount.

Process 300 proceeds to step 320 from step 322 and to step 330 from step 326. At each of the steps 320 and 330, a user swipe direction is detected. In response to a determination at step 320 of a user swipe to the right, process 300 proceeds to step 318, and in response to a determination at step 320 of a user swipe to the left, process 300 proceeds to step 332. Correspondingly, in response to a determination at step 330 of a user swipe to the right, process 300 proceeds to step 328, and in response to a determination at step 330 of a user swipe to the left, process 300 proceeds to step 334. At each of the steps 318 and 334, the skip time, S, as a function of an elapsed (viewed portion) media content runtime is reset to a minimum possible skip time granularity, and at each of the steps 332 and 328, the skip time, S, as a function of a remaining (unviewed portion) media content runtime is reset to a maximum possible skip time granularity. For example, assuming S represents a skip unit of 2× with a maximum skip unit of 10× and a minimum skip unit of 1×, at steps 318 and 334 the skip time is reset to 1×, and at steps 332 and 328 the skip time is reset to 10×, when the swipe distance is the maximum swipe distance. When the swipe distance is less than the maximum swipe distance, then the skip time will be reset to a value between the current skip time (S) and the minimum skip time amount at steps 318 and 334, and between the current skip time (S) and the maximum skip time amount at steps 332 and 328. In some embodiments, the amount the skip time is changed is proportional to the swipe distance relative to the maximum swipe distance. Process 300 proceeds to step 306, awaiting the next user touch or swipe, after each of the steps 318, 332, 334, and 328. In some embodiments, steps 318, 332, 334, and 328 reset the skip time (S) to a new value that is then used the next time a skip button is touched. In some embodiments, steps 318, 332, 334, and 328 reset the skip time (S) to a new value and skip the media content forward or backwards based on the reset skip time amount.

Figure 4:
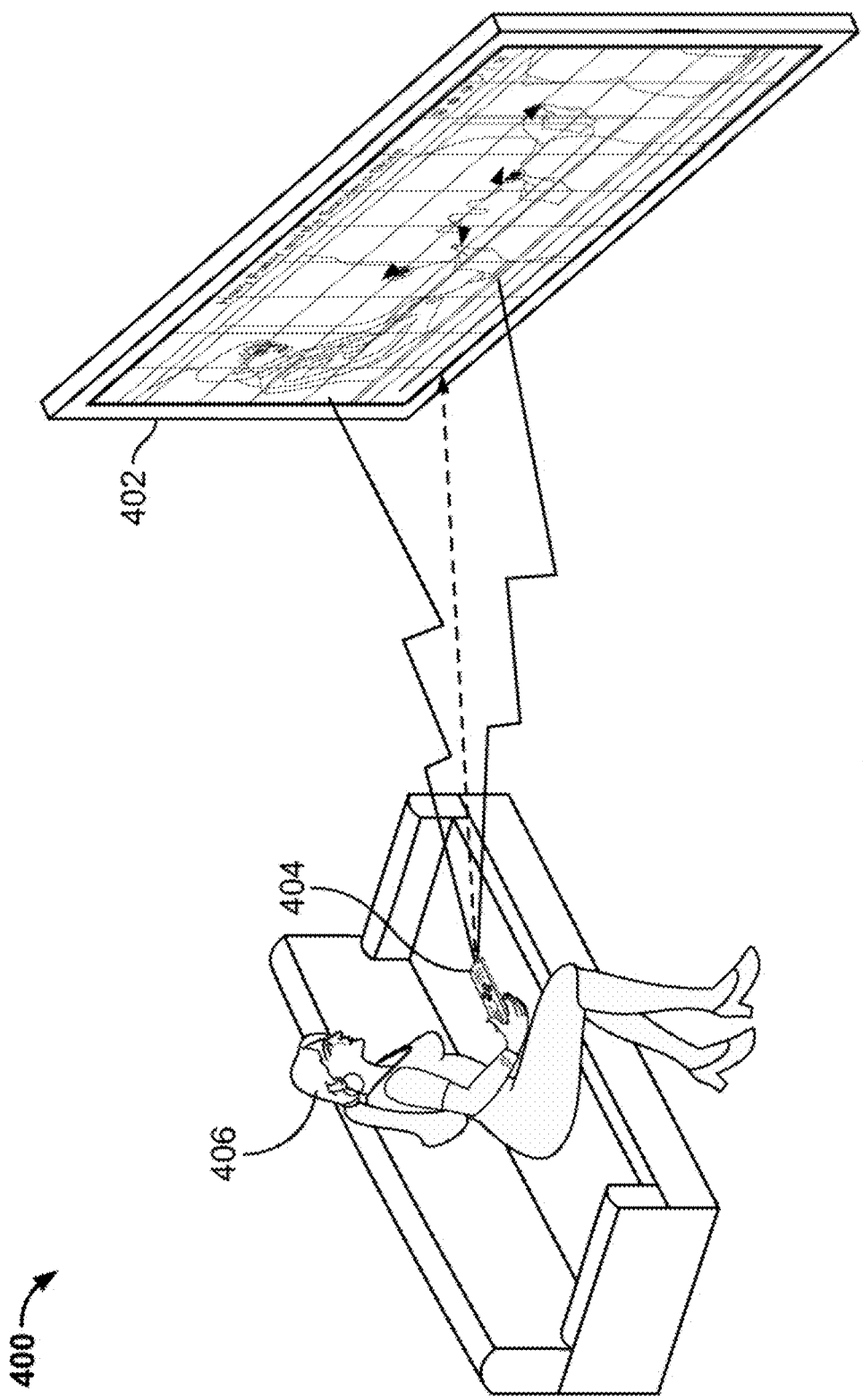
FIGS. 4-7 show illustrative examples of various skip operations, in accordance with disclosed embodiments and methods.

FIGS. 4-7 show illustrative examples of various skip operations, in accordance with disclosed embodiments and methods. FIG. 4 shows an example skip operation 400 with a user 406 electronically controlling a media device 402 through an electronic guidance device 404 while user 406 is comfortably sitting on a couch. By way of example, media device 402 may be a television and device 404 may be a remote-control device in electronic communication with the television, through wire or wirelessly. Media device 402 receives input from user 406. For example, media device 402 may receive user action from user 406 as input. Some examples of user actions are user swipe, user button touch, or user button click on device 404 (a non-touchscreen screen display), which in turn translates the received user actions to digital signals and transmits the digital signals wirelessly to device 402. In some embodiments, user 406 may control the skip functionality of device 404 as discussed with reference to device 604 of FIG. 6. In some embodiments, user 406 may control the skip functionality of device 404 through other suitable configuration. For example, a user 406 input action on a skip button may cause a skip time amount adjustment.

Figure 5:
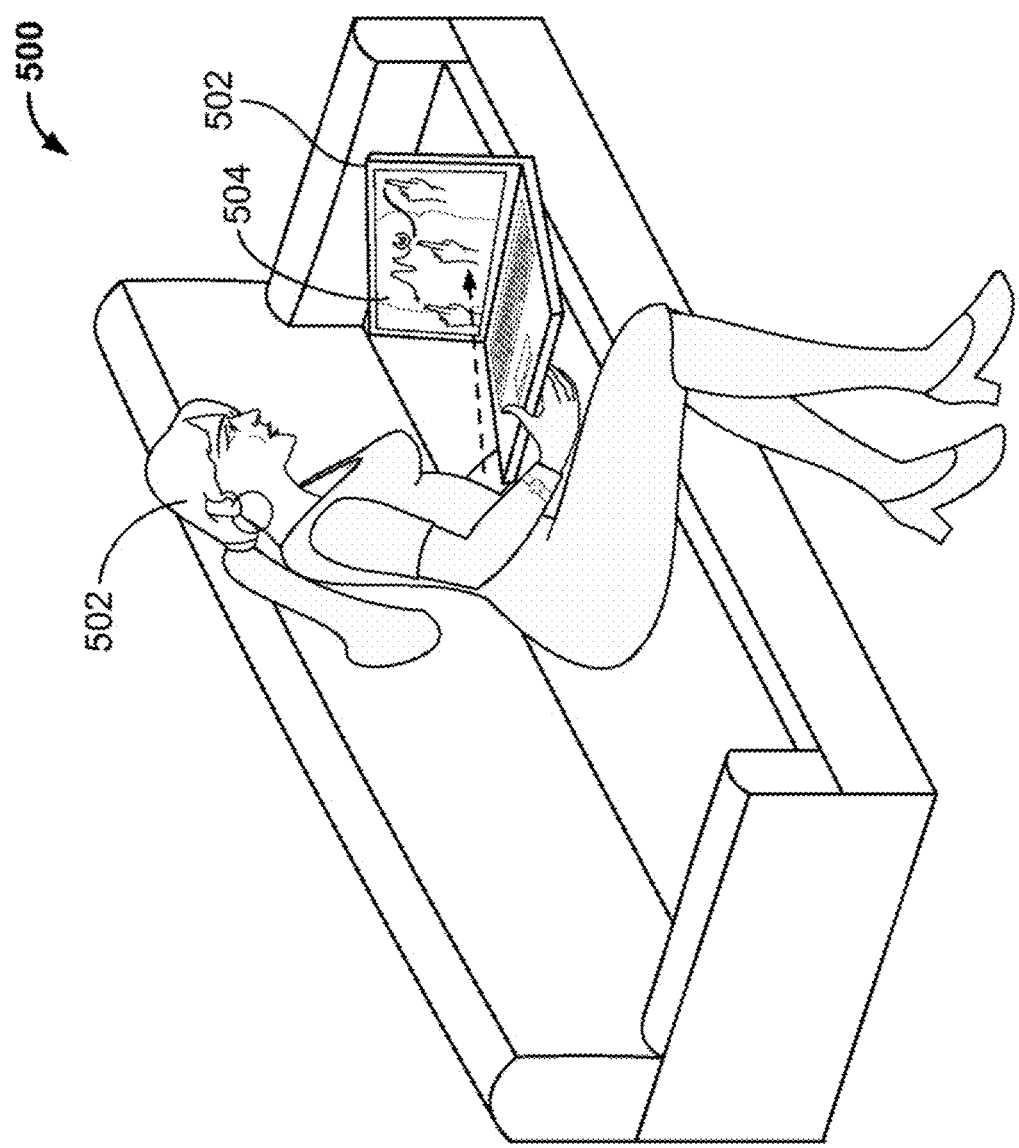

FIG. 5 shows an example skip operation 500 with a user 506 electronically controlling a media device 502 with touchscreen capability at screen display 504. Media device 502 may be a laptop computer, as shown in FIG. 5. While sitting on a couch, watching a Harry Potter episode, user 506 can adjust the skip features at screen display 504. A user 506 swipe action enables user 506 to adjust the skip time amount and skip direction. Pressing on screen display 504 while sliding or swiping in each direction, user 506 can adjust the skip time amount and the skip direction of media device 502.

Figure 6:
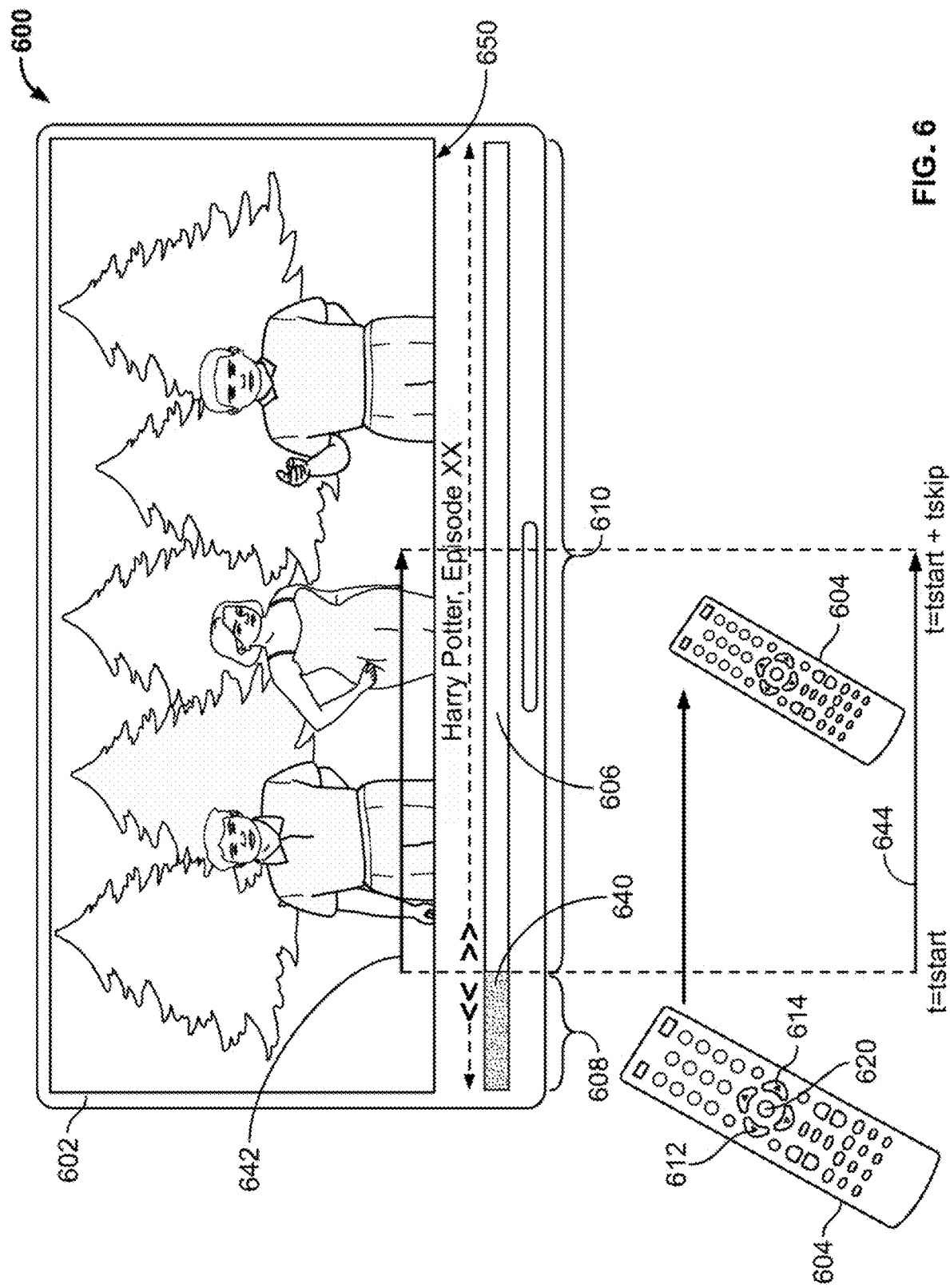

FIG. 6 illustrates an example skip operation, according to various embodiments of the disclosure. In FIG. 6, an example skip operation is shown with a media device 600 in accordance with various disclosures. Media device 600 includes a media device screen display 650 presenting a media content 602 undergoing a skip operation. In some embodiments, media device 600 is controlled by a media controller device 604. For example, media device 600 may be a smart television, a smart phone, a tablet, or computer, controlled by a remote-control device. In some disclosed methods and systems, media controller device 604, may be absent and all media controller device 604 functions are performed by media device 600. In some embodiments, media controller device 604 is incorporated, in part or in whole, into media device 600. In the example of FIG. 6, media controller device 604 is externally located relative to media device 600, communicatively coupled by wire or wireless communications techniques to media device 600. In FIG. 6, media content 602, Harry Potter episode XX, plays on screen display 650.

In FIG. 6, media controller device 604 is shown to include multiple skip functionality features. Media controller device 604 functionality features may include skip buttons or other suitable skip functionality, as earlier described. In some embodiments, media controller device 604 includes a right skip button 614, a left skip button 612, and the play button 620. In FIG. 6, skip buttons 612 and 614 receive user action input for controlling the skip time amount of media content 602. In response to detecting a user skip action through skip buttons 612 and 614, the Harry Potter episode XX may be skipped forward or backward, and through physical displacement of media controller device 604, in, for example, a horizontal direction, parallel to the plane of the figure page, Harry Potter episode XX may be skipped by a skip time amount. For example, a user action physically moving media controller device 604 to the right by a skip length from a play position time, $t=t_{start}$, into the Harry Potter episode XX, to a play position time, $t_{start}+t_{skip}$, into the Harry Potter episode XX, skips the Harry Potter episode XX by a skip time amount proportionate to the skip length. In some embodiments, a user action to move media controller device 604 in the right or the left direction may determine the skip direction, alleviating the need for skip buttons 612 and 614. In these embodiments, the skip length may be determined by the amount of physical displacement of media controller device 604, as described above. In some embodiments, media controller device 604 includes or is connected to sensor devices, such as motion sensors, to detect the position of media controller device 604 while in motion. In some embodiments, buttons 612 and 614, when activated, cause media device 600 to perform steps 312-316 in FIG. 3.

In the example of FIG. 6, the current play position is a play position between a remaining portion 610 and an elapsed portion 608 of media content 602. An input, such as a user action, is detected, for example, by a user pressing play button 620 to cause media device 600 to start to play the Harry Potter episode XX from a play position 640. In an example operation, in FIG. 6, pressing skip button 614 causes the Harry Potter episode XX to advance from a reference play position, play position time $t=t_{start}$, by a skip time amount, $t=t_{start}+t_{skip}$, a total play position time 644.

In an example skip operation, control of skip buttons 612 and 614 of media controller device 604 by a media content consumer can facilitate media content adjustment on media device 600 to perform rapid and accurate media content skip operations on the Harry Potter episode XX with convenience and flexibility. For example, a user can skip the episode forward from the beginning of the episode to elapsed portion 608 (at play position time 640), by pressing skip button 614 (or 612), "N" number of times. The number of times the skip button is pressed determines the skip time amount. Correspondingly, the user may skip the episode XX backward from play position time 640 to the beginning of episode XX with skip button 614 (or 612) by pressing the button a user-defined number of times, which determines the skip time amount.

Media device 600 may optionally include progress functionality features. In some embodiments, media device 600 includes a media content progress bar 606. Media content progress bar 606 indicates an elapsed portion 608 of media content 602 with a hashed part of the bar and a remaining portion 610 of media content 602 with an unfilled part of the bar. In some embodiments, the progress functionality features include a current play time and the total play time of the content. In some embodiments, progress functionality features include a percentage that represents the ratio of the elapsed portion to total play time of the content.

In some embodiments, an overlay grid, analogous to grid 208 (in FIG. 2), improves user skip time control by enabling the user to reach an intended play position time with greater accuracy. Further, displaying the grid on the media device screen display of media device 600 improves user skip operation convenience. The user is made better aware of the skip operation progress relative to play positions with the benefit of real-time visual access to the relationship between the two. For example, the user may control the skip amount while viewing the play position, for example, decreasing the skip amount when approaching the intended play position. Examples of visual representation of such skip time amount progress are a bar, graph, circle, chart, or any other suitable visual representation. In some embodiments, skip time progress and/or skip time amounts may be by audio representation. For example, media device 600 may announce the skip operation progress relative to media content play positions with internal or external speakers.

As previously discussed, a viewer may choose to start consuming episode XX from the beginning of the episode to a position past play position 640, or vice versa, using skip buttons 612, 614 or a combination of both. The number of different combinations of features and functionalities are too many to list herein. But in any suitable combination, a customized skip time button feature, such as the nonlimiting examples of buttons 612 and 614, helps improve user experience by converging to the precise user-intended play position in the media content (e.g., a Harry Potter scene).

It is understood that while various media device features are shown in disclosed embodiments and systems, other suitable features may be employed. For example, display indicators showing other media content attributes may take the place of or serve as added features to those shown and discussed herein. Additionally, disclosed features may be configured differently on a media device screen display than as is disclosed herein.

Figure 7:
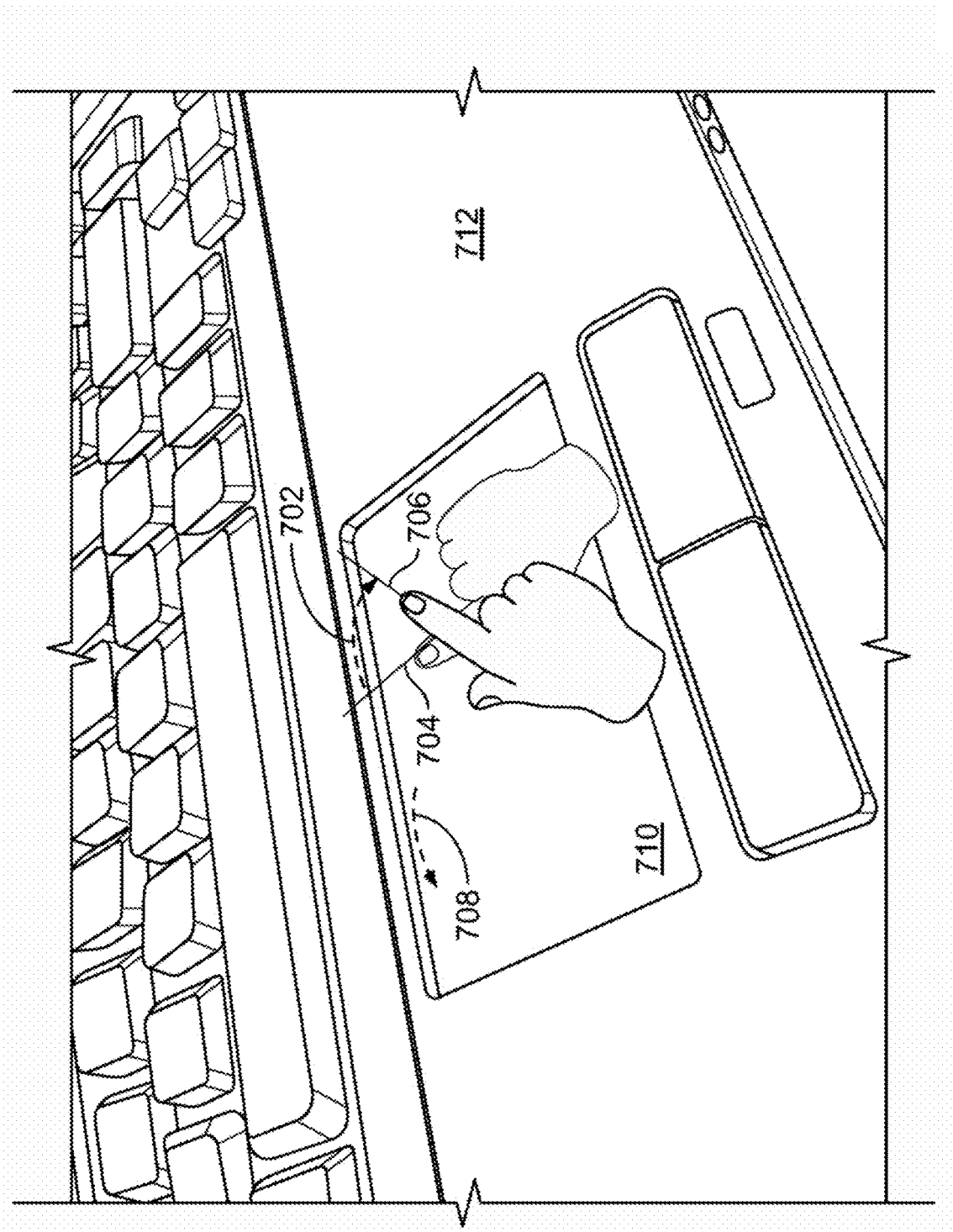

In yet another example, shown in FIG. 7, a user may control skip time functionality through a trackpad 710 of a media device 712. In the example of FIG. 7, media device 712 is a laptop computer. A user swipe length and a user swipe direction, on trackpad 710, corresponds to a skip time amount and a skip direction, respectively. For example, a user swipe from a trackpad position 704 to a trackpad position 706, by a length 702 in a right swipe direction, respectively, determines the skip time amount and the skip direction of a media content playing on the laptop computer 712. Correspondingly, a user swipe length 708 in a left direction from trackpad position 704 determines the skip time amount (based on the swipe length) and the skip direction (based on the swipe direction) of a media content playing on the laptop computer 712.

Figure 8:
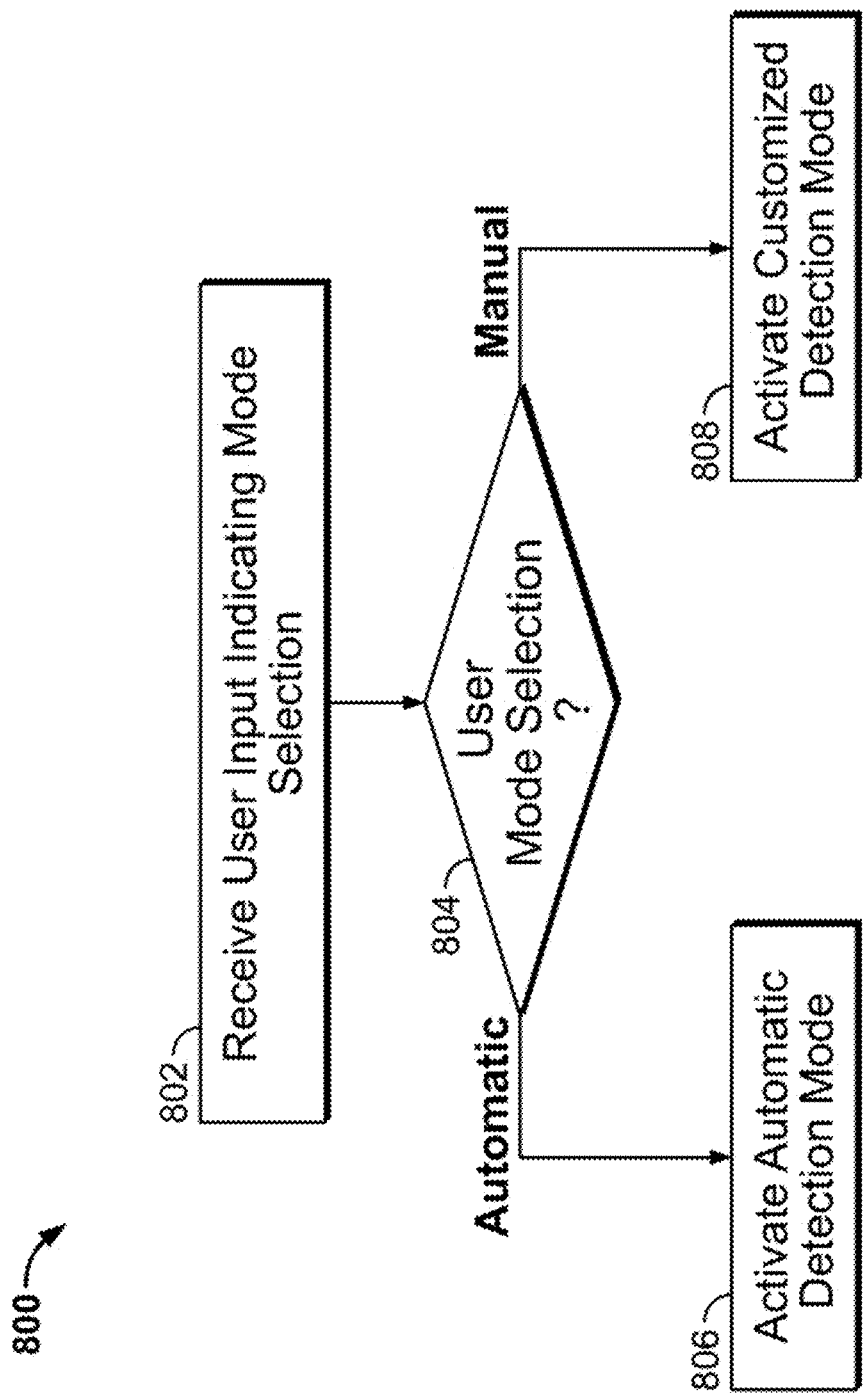
FIG. 8 depicts an illustrative flowchart of a process for mode selection, in accordance with some embodiments of the disclosure.

FIG. 8 depicts a flowchart of an example mode selection process, in accordance with disclosed methods and embodiments. In FIG. 8, a flowchart of a mode selection process 800 is shown in accordance with disclosed methods and embodiments. At step 802 of process 800 circuitry, such as control circuitry 1120 or 1128 of computing device 1118 (FIG. 11), may receive an input indicative of a user action, such as a user button or a user swipe activation. At step 804, the received input at step 802 is detected as a selection between an automatic mode and a customized mode. In some embodiments, a user may make a mode selection with a push button or swipe action on a touchscreen or using a media controller guide, as previously discussed relative to preceding figures. For example, a user button depression one or more times, as previously discussed relative to skip buttons, may indicate a mode selection a single push button input may indicate an automatic mode selection, and two consecutive push button inputs may indicate a customized mode selection, or vice versa. Alternatively, a user swipe action direction may indicate mode selection. Other suitable input-driven mode selection mechanisms may be employed. In some embodiments, a default mode selection may be implemented. For example, a user touch on a touchscreen may be indicative of an automatic mode selection until a user swipe action is detected, if at all, signifying a customized mode selection.

Figure 9:
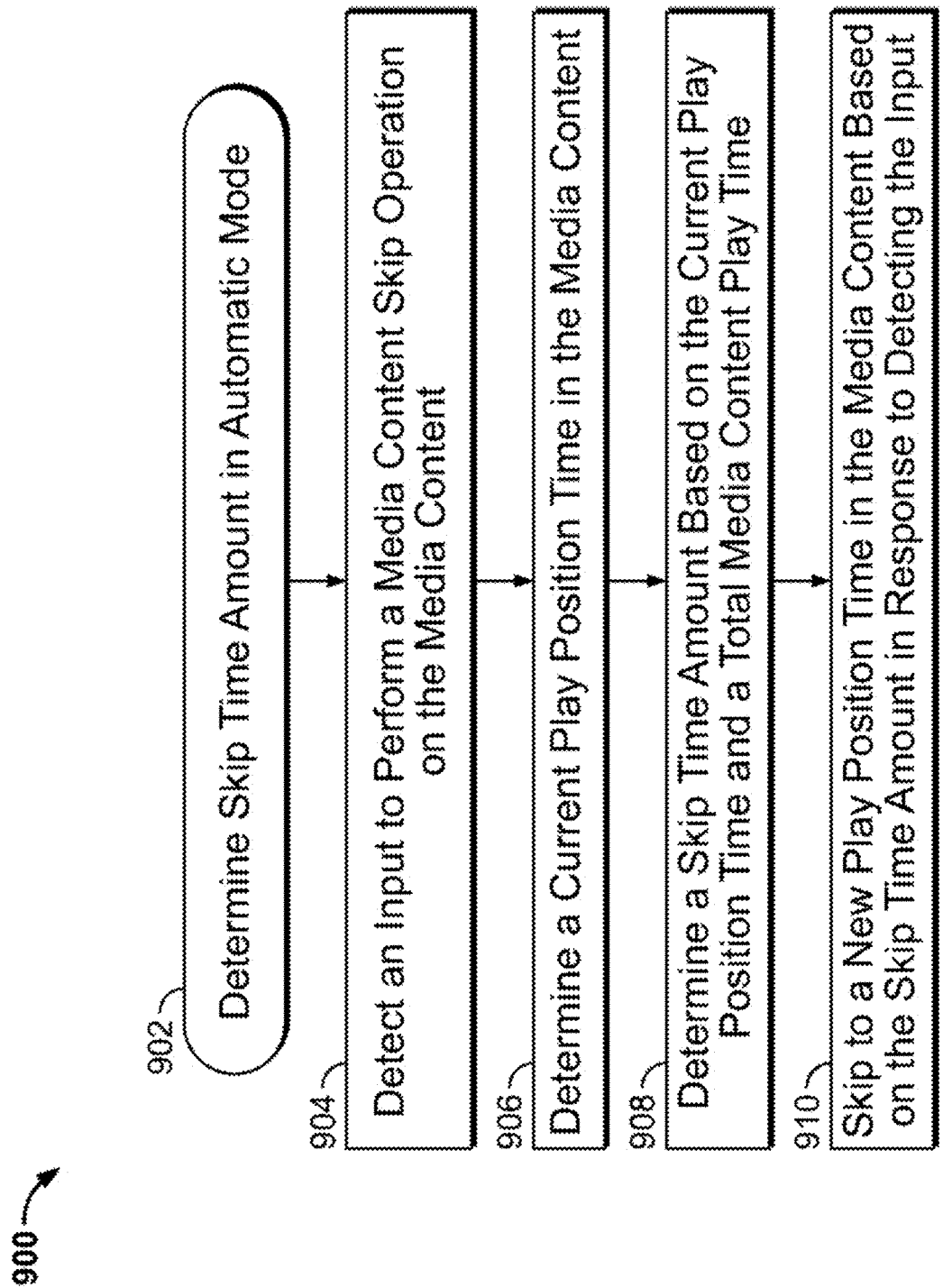
FIG. 9 depicts an illustrative flowchart of a process for determining a skip time amount in an automatic mode, in accordance with some embodiments of the disclosure.

FIG. 9 depicts a flowchart of an example skip time process in an automatic mode, in accordance with disclosed methods and embodiments. In FIG. 9, a flowchart of a skip process 900 in an automatic mode is shown in accordance with disclosed methods and embodiments. An automatic skip time determination process starts at step 902. At step 904, an input is detected to perform a media content skip operation on a media content. Referring to the Harry Potter episode example, a number of user screen display touches, skip button depressions, or screen display swipes, for example, may be detected. In some embodiments, an input circuit 1116 (FIG. 11) detects an input in the form of a user action. Next, at step 906, a current play position time in the media content is determined. An example current play position time may be at t−72 minutes, in FIG. 1B. At step 908, a skip time amount is determined based on the current play position time (of step 906) and a total media content play time. An example total media content play time is 120 minutes, in the example of FIG. 1B. At step 910, in response to detecting the input at step 904, the media content is skipped to a new play position time based on the skip time amount determined at step 908. In some embodiments, processing circuitry 1140 or processing circuitry 1126 of FIG. 11 may perform steps 904-910.

Figure 10:
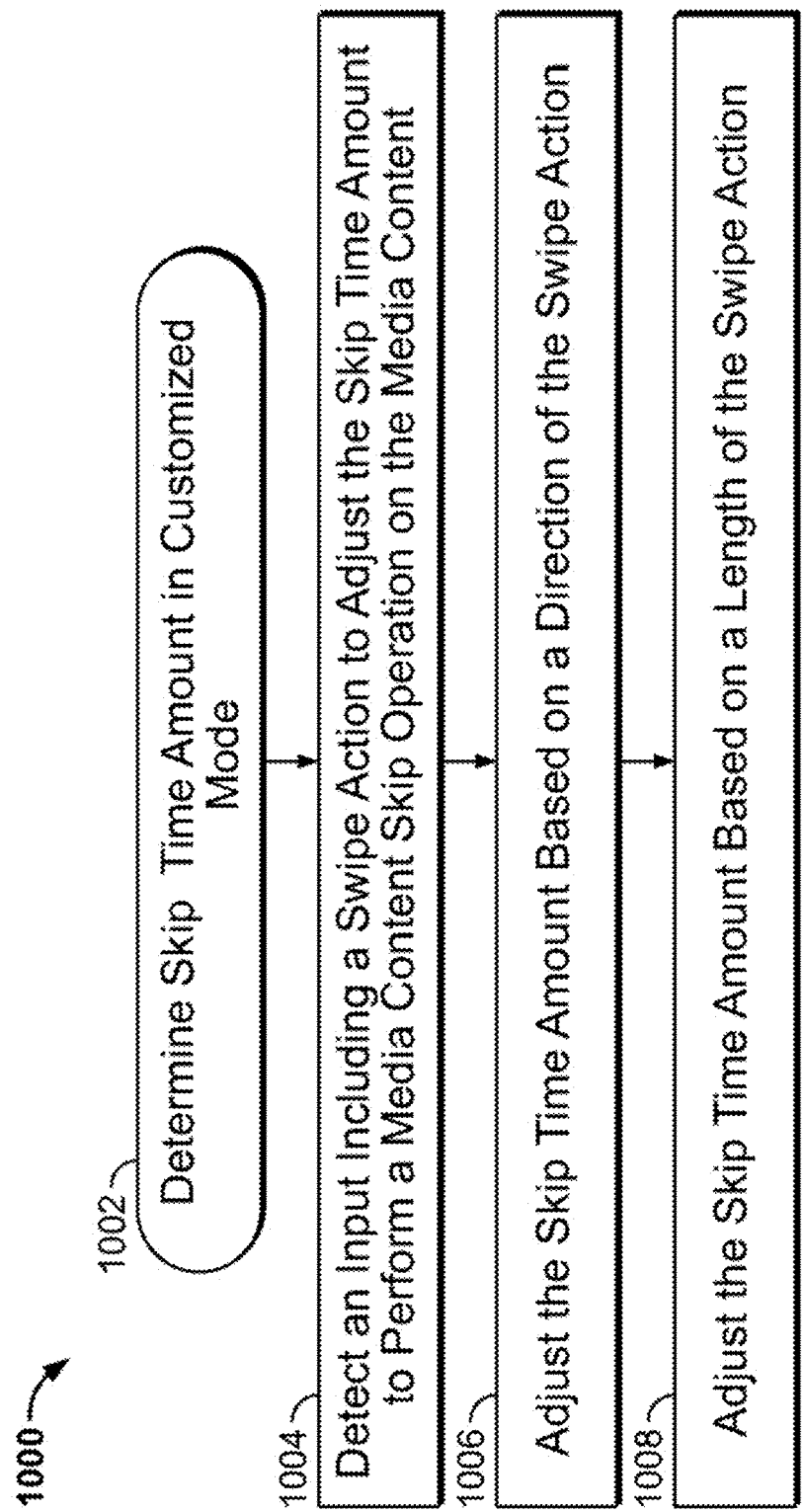
FIG. 10 depicts an illustrative flowchart of a process for determining a skip time amount in a customized mode, in accordance with some embodiments of the disclosure.

FIG. 10 depicts a flowchart of an example skip process in a customized mode, in accordance with disclosed methods and embodiments. In FIG. 10, a flowchart of a skip process 1000 in a customized mode is shown in accordance with disclosed methods and embodiments. Process 1000 begins at step 1002 where a skip time amount is determined in accordance with some embodiments. At step 1004, an input including a swipe action to adjust the skip time amount to perform a media content skip operation on the media content is detected. In some embodiments, the input includes a user swipe action along a touchscreen, such as the touchscreen of FIG. 2. The input may include a media controller device displacement and/or one or more skip button actions in a particular direction, as discussed in reference to FIG. 6. At step 1006, the skip time amount is based on a swipe action direction, as discussed relative to FIGS. 1A, 1B, 2, and 6. Next, at step 1008, a skip time adjustment is performed automatically based on a length of the swipe action, for example, as discussed relative to FIGS. 1A, 1B, 2, and 6. In some embodiments, processing circuitry 1140 or processing circuitry 1126 of FIG. 11 may perform steps 1002-1008.

Although a particular order and flow of steps is depicted in each of FIGS. 8-10, it will be understood that in some embodiments one or more of the steps may be modified, moved, removed, or added, and that the flows depicted in FIGS. 8-10 may be accordingly and suitably modified.

Figure 11:
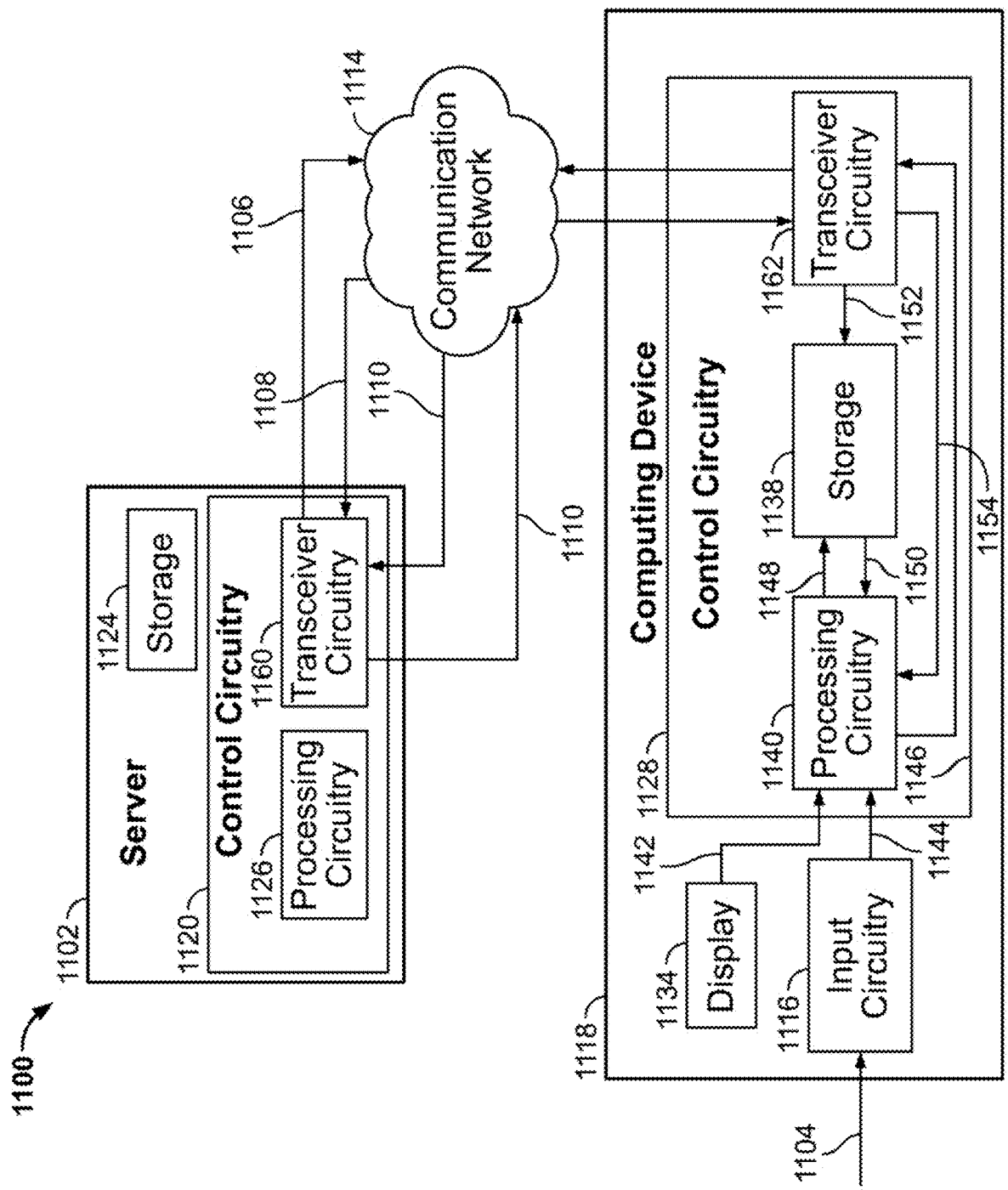
FIG. 11 is a block diagram representing devices, components of each device, and data flow therebetween for a media content skip operation system incorporating skip operation features, in accordance with some embodiments of the disclosure.

FIG. 11 is an illustrative block diagram showing a media content skip operation system incorporating skip operation features, in accordance with some embodiments of the disclosure. In FIG. 11, a media content skip operation system is configured as a media content skip operation system 1100, in accordance with some embodiments of the disclosure. In an embodiment, one or more parts of or the entirety of system 1100 may be configured as a system implementing various features, processes, and components of FIGS. 1-10. Although FIG. 11 shows a certain number of components, in various examples, system 1100 may include fewer than the illustrated number of components and/or multiples of one or more of the illustrated number of components.

System 1100 is shown to include a computing device 1118, a server 1102 and a communication network 1114. It is understood that while a single instance of a component may be shown and described relative to FIG. 11, additional instances of the component may be employed. For example, server 1102 may include, or may be incorporated in, more than one server. Similarly, communication network 1114 may include, or may be incorporated in, more than one communication network. Server 1102 is shown communicatively coupled to computing device 1118 through communication network 1114. While not shown in FIG. 11, server 1102 may be directly communicatively coupled to computing device 1118, for example, in a system absent or bypassing communication network 1114.

Communication network 1114 may comprise one or more network systems, such as, without limitation, an Internet, LAN, WIFI or other network systems suitable for audio processing applications. In some embodiments, system 1100 excludes server 1102, and functionality that would otherwise be implemented by server 1102 is instead implemented by other components of system 1100, such as one or more components of communication network 1114. In still other embodiments, server 1102 works in conjunction with one or more components of communication network 1114 to implement certain functionality described herein in a distributed or cooperative manner. Similarly, in some embodiments, system 1100 excludes computing device 1118, and functionality that would otherwise be implemented by computing device 1118 is instead implemented by other components of system 1100, such as one or more components of communication network 1114 or server 1102 or a combination. In still other embodiments, computing device 1118 works in conjunction with one or more components of communication network 1114 or server 1102 to implement certain functionality described herein in a distributed or cooperative manner.

Computing device 1118 includes control circuitry 1128, display 1134 and input circuitry 1116. Control circuitry 1128 in turn includes transceiver circuitry 1162, storage 1138 and processing circuitry 1140. In some embodiments, computing device 1118 or control circuitry 1128 may be configured as media devices 402, 502, 600, or 712 of FIGS. 4, 5, 6, and 7, respectively.

Server 1102 includes control circuitry 1120 and storage 1124. Each of storages 1124 and 1138 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 1124, 1138 may be used to store various types of content, metadata, and or other types of data. Non-volatile memory may also be used (e.g., to launch a boot-up routine and other instructions). Cloud-based storage may be used to supplement storages 1124, 1138 or instead of storages 1124, 1138. In some embodiments, control circuitry 1120 and/or 1128 executes instructions for an application stored in memory (e.g., storage 1124 and/or storage 1138). Specifically, control circuitry 1120 and/or 1128 may be instructed by the application to perform the functions discussed herein. In some implementations, any action performed by control circuitry 1120 and/or 1128 may be based on instructions received from the application. For example, the application may be implemented as software or a set of executable instructions that may be stored in storage 1124 and/or 1138 and executed by control circuitry 1120 and/or 1128. In some embodiments, the application may be a client/server application where only a client application resides on computing device 1118, and a server application resides on server 1102.

The application may be implemented using any suitable architecture. For example, it may be a stand-alone application wholly implemented on computing device 1118. In such an approach, instructions for the application are stored locally (e.g., in storage 1138), and data for use by the application is downloaded on a periodic basis (e.g., from an out-of-band feed, from an Internet resource, or using another suitable approach). Control circuitry 1128 may retrieve instructions for the application from storage 1138 and process the instructions to perform the functionality described herein. Based on the processed instructions, control circuitry 1128 may determine a type of action to perform in response to input received from input circuitry 1116 or from communication network 1114. For example, in response to a user swipe action and/or swipe direction, control circuitry 1128 may perform the steps of process 300 (FIG. 3) or processes relative to various embodiments, such as the example of FIGS. 1A, 1B, and 2.

In client/server-based embodiments, control circuitry 1128 may include communication circuitry suitable for communicating with an application server (e.g., server 1102) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1114). In another example of a client/server-based application, control circuitry 1128 runs a web browser that interprets web pages provided by a remote server (e.g., server 1102). For example, the remote server may store the instructions for the application in a storage device. The remote server may process the stored instructions using circuitry (e.g., control circuitry 1128) and/or generate displays. Computing device 1118 may receive the displays generated by the remote server and may display the content of the displays locally via display 1134. This way, the processing of the instructions is performed remotely (e.g., by server 1102) while the resulting displays, such as the display windows described elsewhere herein, are provided locally on computing device 1118. Computing device 1118 may receive inputs from the user via input circuitry 1116 and transmit those inputs to the remote server for processing and generating the corresponding displays. Alternatively, computing device 1118 may receive inputs from the user via input circuitry 1116 and process and display the received inputs locally, by control circuitry 1128 and display 1134, respectively.

Server 1102 and computing device 1118 may transmit and receive content and data such as media content via communication network 1114. For example, server 1102 may be a media content provider, and computing device 1118 may be a smart television configured to download or stream media content, such as a Harry Potter episode, from server 1102.

Control circuitry 1120, 1128 may send and receive commands, requests, and other suitable data through communication network 1114 using transceiver circuitry 1160, 1162, respectively. Control circuitry 1120, 1128 may communicate directly with each other using transceiver circuits 1160, 1162, respectively, avoiding communication network 1114.

It is understood that computing device 1118 is not limited to the embodiments and methods shown and described herein. In nonlimiting examples, computing device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Control circuitry 1120 and/or 1118 may be based on any suitable processing circuitry such as processing circuitry 1126 and/or 1140, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1120 and/or control circuitry 1118 are configured to implement a media content operation system, such as systems, or parts thereof, that perform various media content manipulation processes described and shown in connection with FIGS. 3, and 8-10 and/or systems carrying out the features described and shown relative to FIGS. 1-2 and 4-7.

Computing device 1118 receives a user input 1104 at input circuitry 1116. For example, computing device 1118 may receive a user input like a user swipe or user touch, as previously discussed. In some embodiments, computing device 1118 is a media device (or player) configured as media devices 402, 502, 602, or 712, with the capability to access media content. It is understood that computing device 1118 is not limited to the embodiments and methods shown and described herein. In nonlimiting examples, computing device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1104 may be received from a user gesture-capturing interface that is separate from device 1118, such as a remote control device, trackpad or any other suitable user movement sensitive or capture devices, or as part of device 1118, such as a touchscreen of display 1134. Transmission of user input 1104 to computing device 1118 may be accomplished using a wired connection, such as an audio cable, USB cable, ethernet cable or the like attached to a corresponding input port at local device 300, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 1116 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 1140 may receive input 1104 from input circuit 1116. Processing circuitry 1140 may convert or translate the received user input 1104 that may be in the form of gestures or movement to digital signals. In some embodiments, input circuit 1116 performs the translation to digital signals. In some embodiments, processing circuitry 1140 (or processing circuitry 1126, as the case may be) carries out disclosed processes and methods. For example, processing circuitry 1140 or processing circuitry 1126 may perform processes 300, 800, 900, and 1000 of FIGS. 3, 8, 9, and 10, respectively.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of determining a skip time for navigating media content, the method comprising:
    detecting a current play position time in the media content;
    determining a remaining media content play time based on the current play position time and an ending time of the media content;
    determining a skip time amount based on the remaining media content play time;
    generating for display an icon associated with the skip time amount, wherein the icon is selectable to skip from the current play position time to a new play position time based on the skip time amount;

detecting a first input at a display, wherein the first input comprises a swipe action;
determining that the icon is included in a path of the swipe action;
in response to determining that the icon is included in a path of the swipe action, adjusting the skip time amount based on the swipe action;
receiving a second input selecting the icon; and
skipping to a new play position time in the media content based on the adjusted skip time amount in response to detecting the second input.

2. The method of claim 1, wherein determining the skip time amount comprises:
determining a ratio between a total media content play time and the play position time; and
determining the skip time amount based on the ratio between the total media content play time and the play position time.

3. The method of claim 1, wherein the displayed icon comprises an indication of the skip time amount, and the indication is modified to comprise the adjusted skip time amount when the skip time amount is adjusted.

4. The method of claim 1, wherein the skip operation comprises one of a skip forward operation and a skip backward operation.

5. The method of claim 1, wherein the skip time amount decreases as the remaining media content play time decreases and the current play position time approaches the ending time.

6. The method of claim 1, wherein:
detecting the first input at the display comprises:
determining a distance covered by the swipe action; and
determining a direction of the swipe action; and
adjusting the skip time amount based on the swipe action comprises:
determining, based on the distance covered by the swipe action, a particular amount by which to adjust the skip time; and
determining, based on the direction of the swipe action, whether to increase or decrease the skip time by the particular amount.

7. The method of claim 1, wherein determining the skip time amount based on the remaining media content play time comprises:
determining an initial skip time amount by comparing a total media content play time to a first predefined threshold;
in response to determining the total media content play time is less than the first predefined threshold, setting the skip time amount to a first value corresponding to the initial skip time amount; and
updating the skip time amount based on the remaining media content play time, as the current play position time progresses.

8. The method of claim 7, further comprising:
in response to determining the total media content play time is greater than the first predefined threshold, determining whether the total media content play time is less than a second predefined threshold; and
in response to determining the total media content play time is less than the second predefined threshold, setting the skip time amount to a second value corresponding to the initial skip time amount, wherein the second value is greater than the first value.

9. The method of claim 1, wherein the icon is a first icon, and the skip time amount associated with the first icon is a skip forward time amount, the method further comprising:
determining an elapsed media content play time based on the current play position time and a beginning time of the media content;
determining a skip backward time amount based on the elapsed media content play time; and
generating for display a second icon associated with a skip backward time amount, wherein the icon is selectable to skip backward from the current play position time to an earlier play position time based on the skip backward time amount.

10. The method of claim 9, wherein the swipe action is a first swipe action, the method further comprising:
detecting a third input at a display, wherein the third input comprises a second swipe action;
determining that the second icon is included in a path of the second swipe action;
in response to determining that the second icon is included in a path of the second swipe action, adjusting the skip backward time amount based on the swipe action;
receiving a fourth input selecting the second icon; and
skipping to an earlier play position time in the media content based on the adjusted skip backward time amount in response to detecting the fourth input.

11. A system for determining a skip time amount for navigating media content, the system comprising:
an input circuit configured to:
detect a first input at a display, wherein the first input comprises a swipe action; and
receive a second input selecting the icon; and
control circuitry configured to:
detect a current play position time in the media content;
determine a remaining media content play time based on the current play position time and an ending time of the media content;
determine a skip time amount based on the remaining media content play time;
generate for display the icon, wherein the icon is associated with the skip time amount and is selectable to skip from the current play position time to a new play position time based on the skip time amount;
determine that the icon is included in a path of the swipe action;
in response to determining that the icon is included in a path of the swipe action, adjust the skip time amount based on the swipe action; and
skip to a new play position time in the media content based on the adjusted skip time amount in response to detecting the second input.

12. The system of claim 11, wherein to determine the skip time amount, the control circuitry is further configured to:
determine a ratio between a total media content play time and the play position time; and
determine the skip time amount based on the ratio between the total media content play time and the play position time.

13. The system of claim 11, wherein the the displayed icon comprises an indication of the skip time amount, and the indication is modified to comprise the adjusted skip time amount when the skip time amount is adjusted.

14. The system of claim 11, wherein the skip operation comprises one of a skip forward operation and a skip backward operation.

15. The system of claim 11, wherein the skip time amount decreases as the remaining media content play time decreases and the current play position time approaches the ending time.

16. The system of claim 11, wherein:
the control circuitry is configured to detect the first input at the display by:
 determining a distance covered by the swipe action; and
 determining a direction of the swipe action; and
the control circuitry is configured to adjust the skip time amount based on the swipe action by:
 determining, based on the distance covered by the swipe action, a particular amount by which to adjust the skip time; and
 determining, based on the direction of the swipe action, whether to increase or decrease the skip time by the particular amount.

17. The system of claim 11, wherein the control circuitry is configured to determine the skip time amount based on the remaining media content play time by:
 determining an initial skip time amount by comparing a total media content play time to a first predefined threshold;
 in response to determining the total media content play time is less than the first predefined threshold, setting the skip time amount to a first value corresponding to the initial skip time amount; and
 updating the skip time amount based on the remaining media content play time, as the current play position time progresses.

18. The system of claim 17, wherein the control circuitry is further configured to:
 in response to determining the total media content play time is greater than the first predefined threshold, determine whether the total media content play time is less than a second predefined threshold; and
 in response to determining the total media content play time is less than the second predefined threshold, set the skip time amount to a second value corresponding to the initial skip time amount, wherein the second value is greater than the first value.

19. The system of claim 11, wherein the icon is a first icon, and the skip time amount associated with the first icon is a skip forward time amount, and the control circuitry is further configured to:
 determine an elapsed media content play time based on the current play position time and a beginning time of the media content;
 determine a skip backward time amount based on the elapsed media content play time; and
 generate for display a second icon associated with a skip backward time amount, wherein the icon is selectable to skip backward from the current play position time to an earlier play position time based on the skip backward time amount.

20. The system of claim 19, wherein the swipe action is a first swipe action, the control circuitry is further configured to: detect a third input at a display, wherein the third input comprises a second swipe action; determine that the second icon is included in a path of the second swipe action; in response to determining that the second icon is included in a path of the second swipe action, adjust the skip backward time amount based on the swipe action; receive a fourth input selecting the second icon; and skip to an earlier play position time in the media content based on the adjusted skip backward time amount in response to detecting the fourth input.

* * * * *